United States Patent [19]

Drostholm et al.

[11] 4,050,865
[45] Sept. 27, 1977

[54] BRICK PRESS AND ASSOCIATED EQUIPMENT FOR MAKING BRICKS

[75] Inventors: Frede Hilmar Drostholm, Vedbaek; Harry Jensen, Gentofte; Per Willadsen, Melby, all of Denmark

[73] Assignee: Frede Hilmar Drostholm, Denmark

[21] Appl. No.: 721,867

[22] Filed: Sept. 9, 1976

Related U.S. Application Data

[63] Continuation-in-part of Ser. No. 510,145, Sept. 30, 1974.

[30] Foreign Application Priority Data

Sept. 25, 1975 Australia .................... 85165/75

[51] Int. Cl.² ............... B29C 3/00; B29B 11/04; B29B 11/08
[52] U.S. Cl. ............................... 425/183; 156/94; 156/155; 425/195; 425/417; 425/260; 425/422; 425/261; 425/352; 425/353; 425/354; 249/112; 264/120; 264/112; 264/325
[58] Field of Search ............ 425/193, 195, 461, 183, 425/260, 261, 352, 353, 354, 355, 415, 422, 419; 249/112, 114; 156/94, 155

[56] References Cited

U.S. PATENT DOCUMENTS

| 600,565 | 3/1898 | Wallace | 249/112 |
|---|---|---|---|
| 853,442 | 5/1907 | Cunningham | 249/112 X |
| 938,699 | 11/1909 | Pink | 249/112 |
| 1,412,392 | 4/1922 | Easley | 249/114 |
| 1,511,555 | 10/1924 | Yngve | 425/461 X |
| 3,447,205 | 6/1969 | Dorsey | 425/195 |

FOREIGN PATENT DOCUMENTS

| 959,473 | 6/1964 | United Kingdom |
| 966,432 | 8/1964 | United Kingdom |
| 987,311 | 3/1965 | United Kingdom |
| 1,371,252 | 10/1974 | United Kingdom |

*Primary Examiner*—J. Howard Flint, Jr.
*Attorney, Agent, or Firm*—Synnestvedt & Lechner

[57] ABSTRACT

A brick press is disclosed having a turntable carrying a plurality of molds angularly spaced from each other and having equipment associated therewith establishing a plurality of series of operating stations, each series including at least a precompression station, a compression station and an ejection station. The molds carried by the turntable are provided with replaceable liners. A material handling and feed system is also disclosed, providing for preparation of particulate or granular materials to be charged into the molds.

8 Claims, 43 Drawing Figures

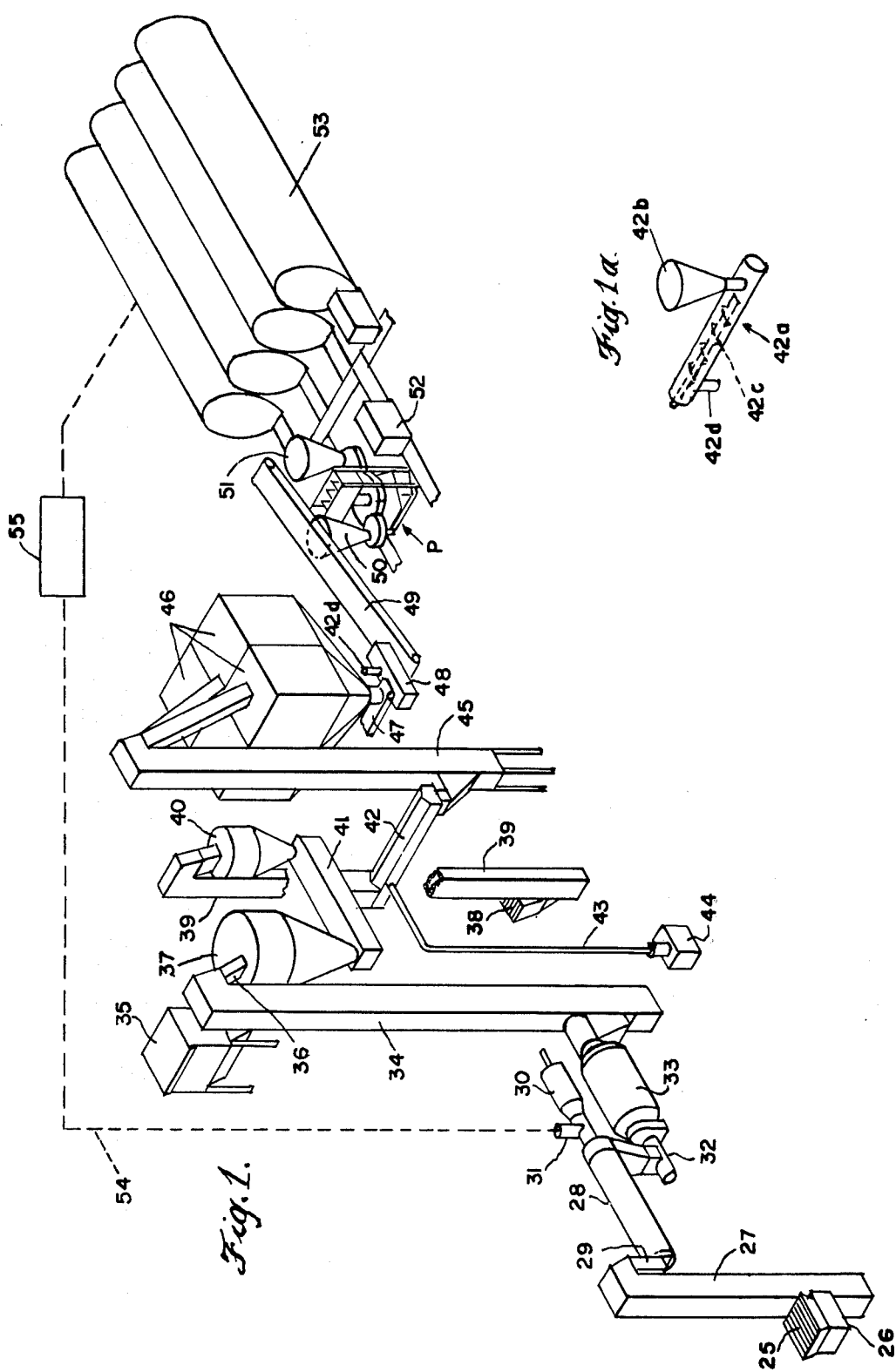

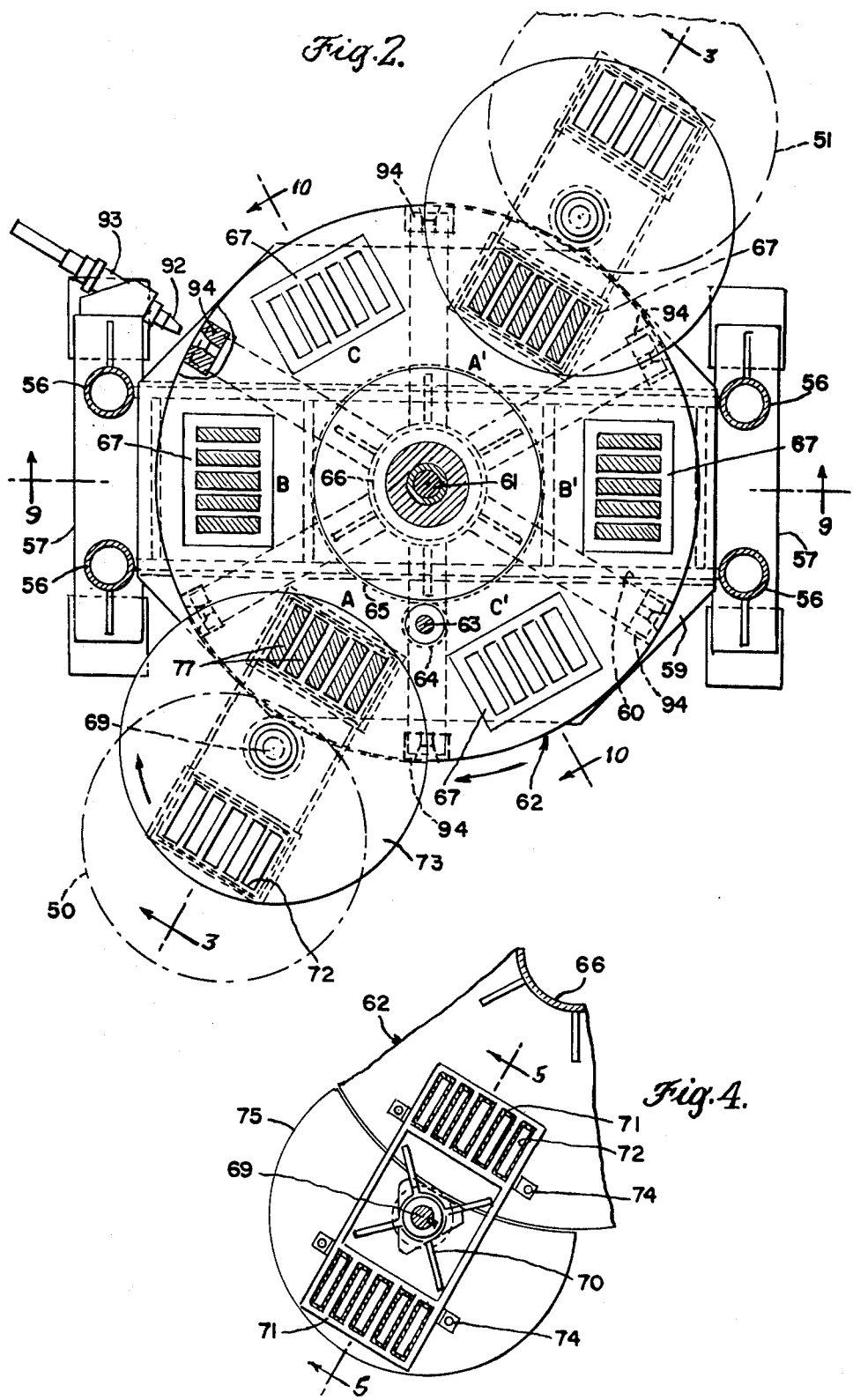

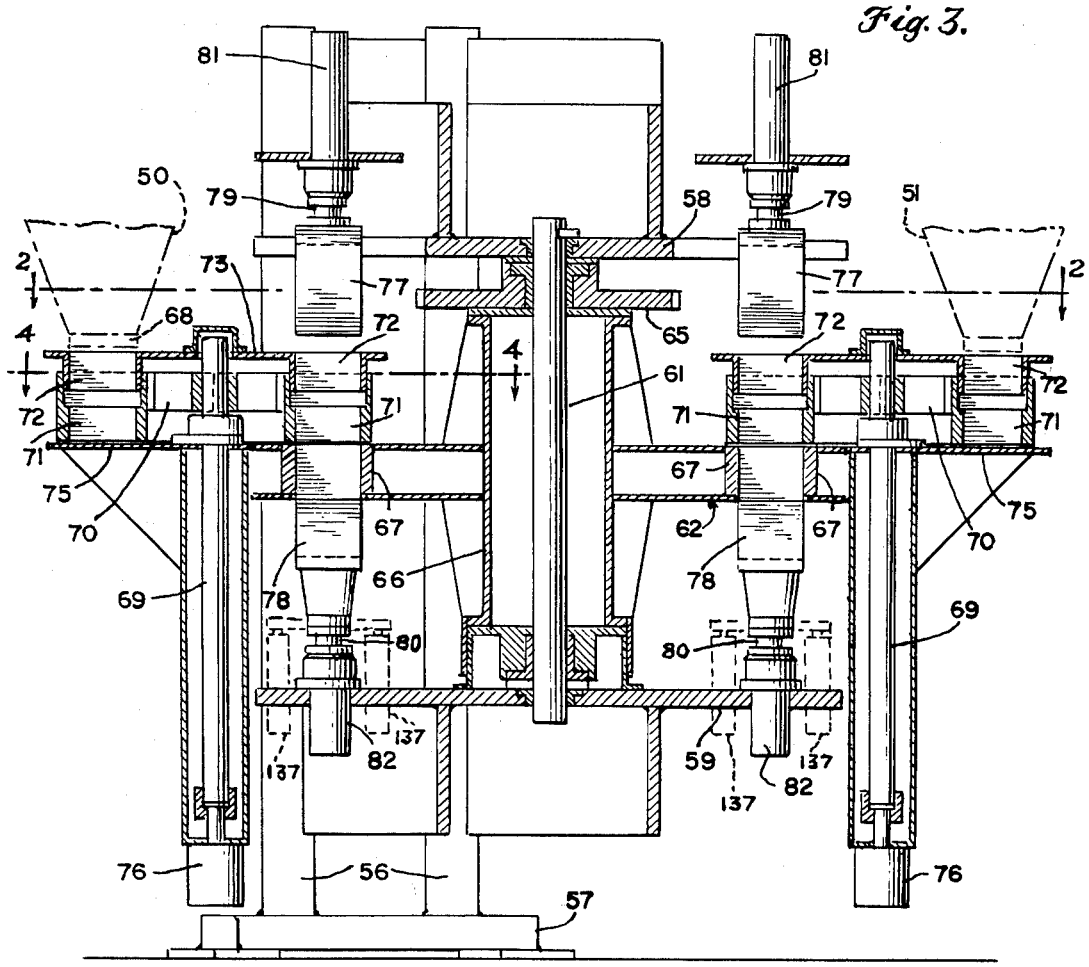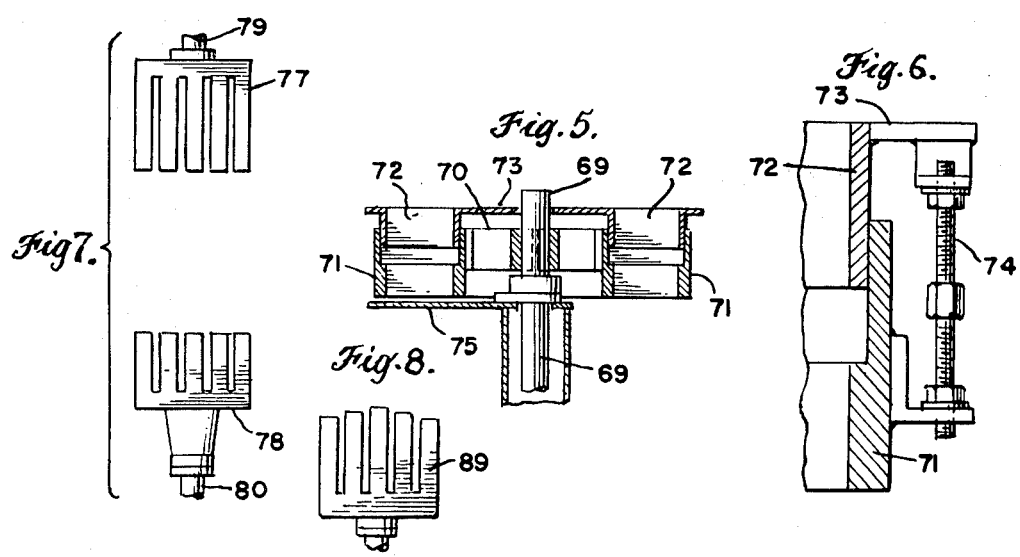

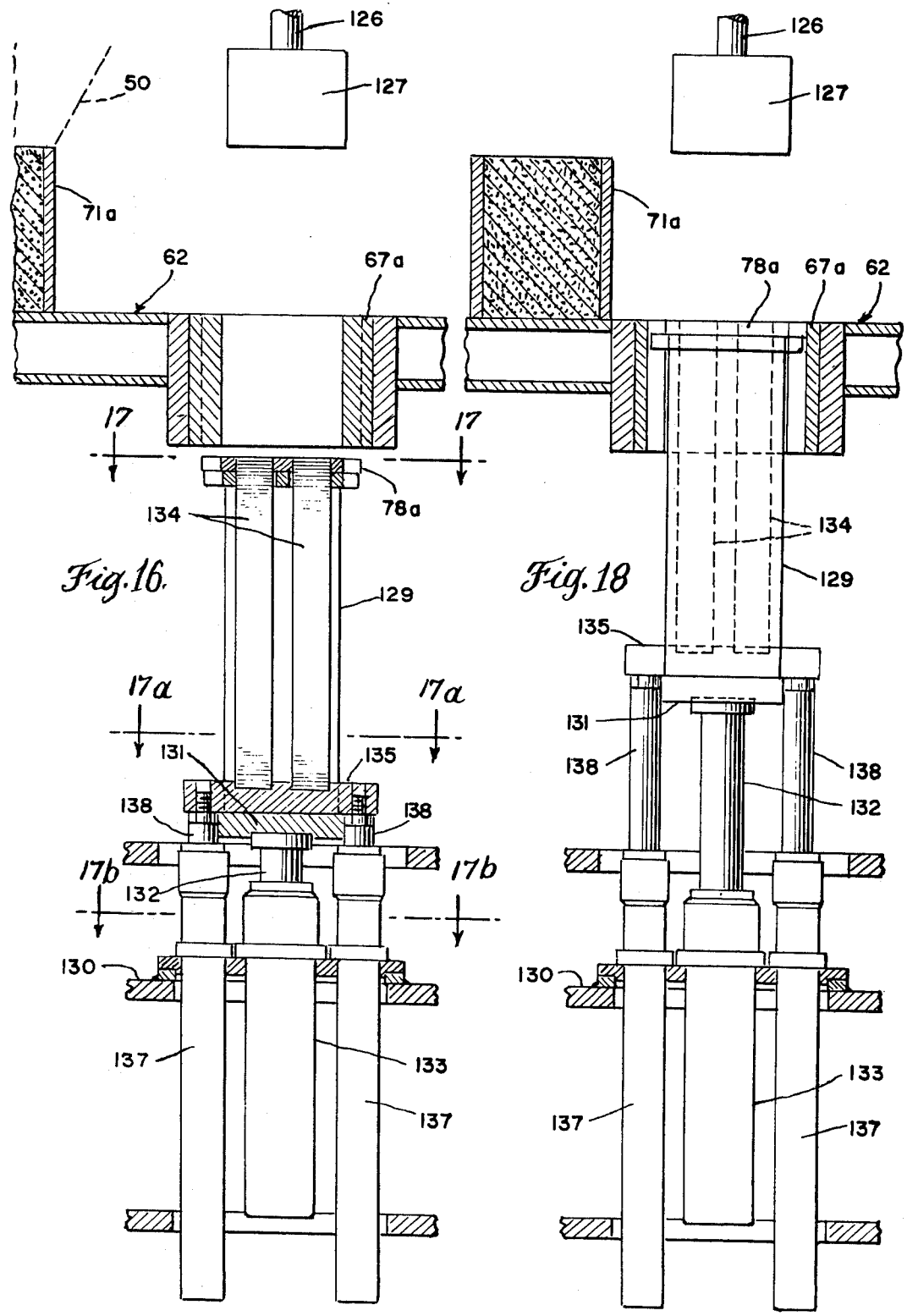

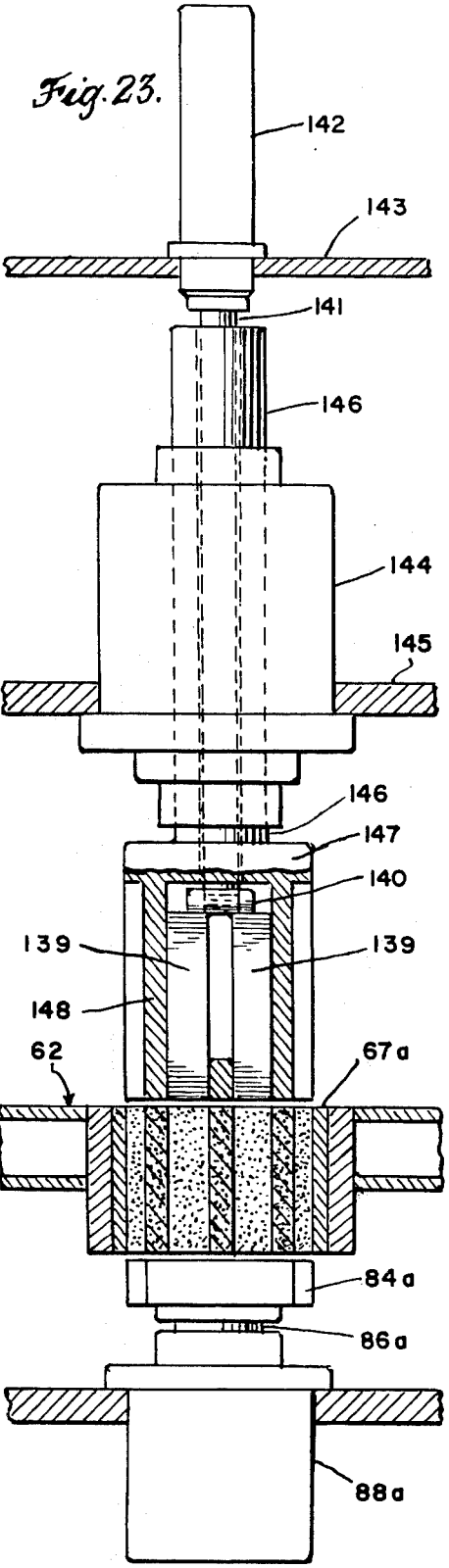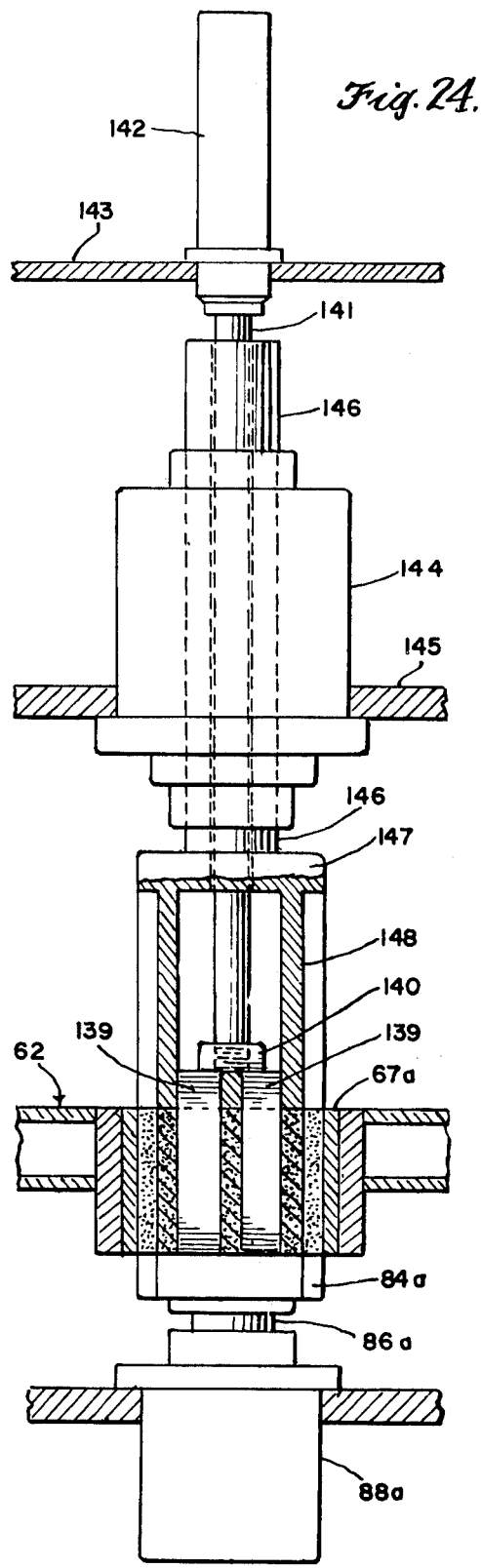

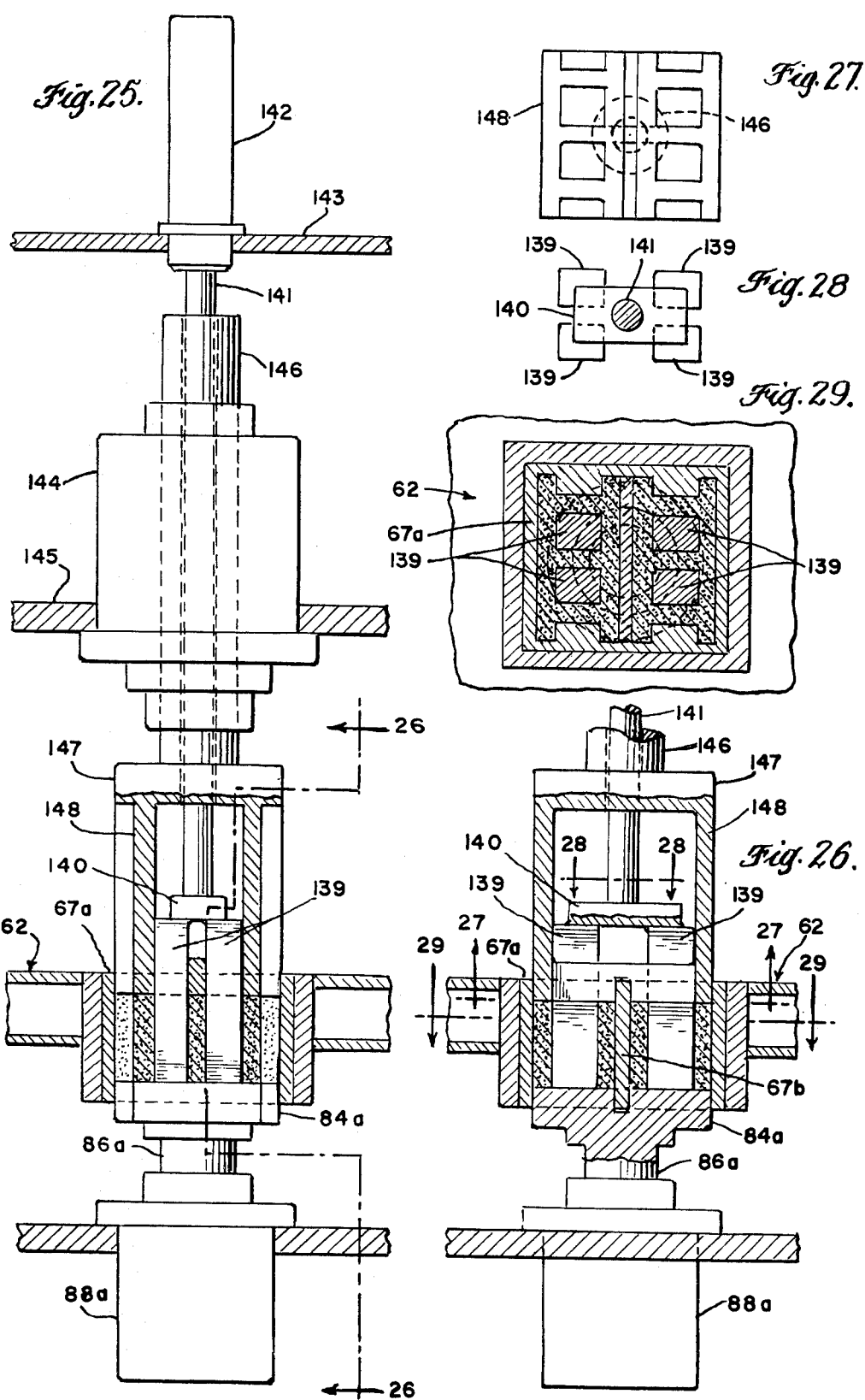

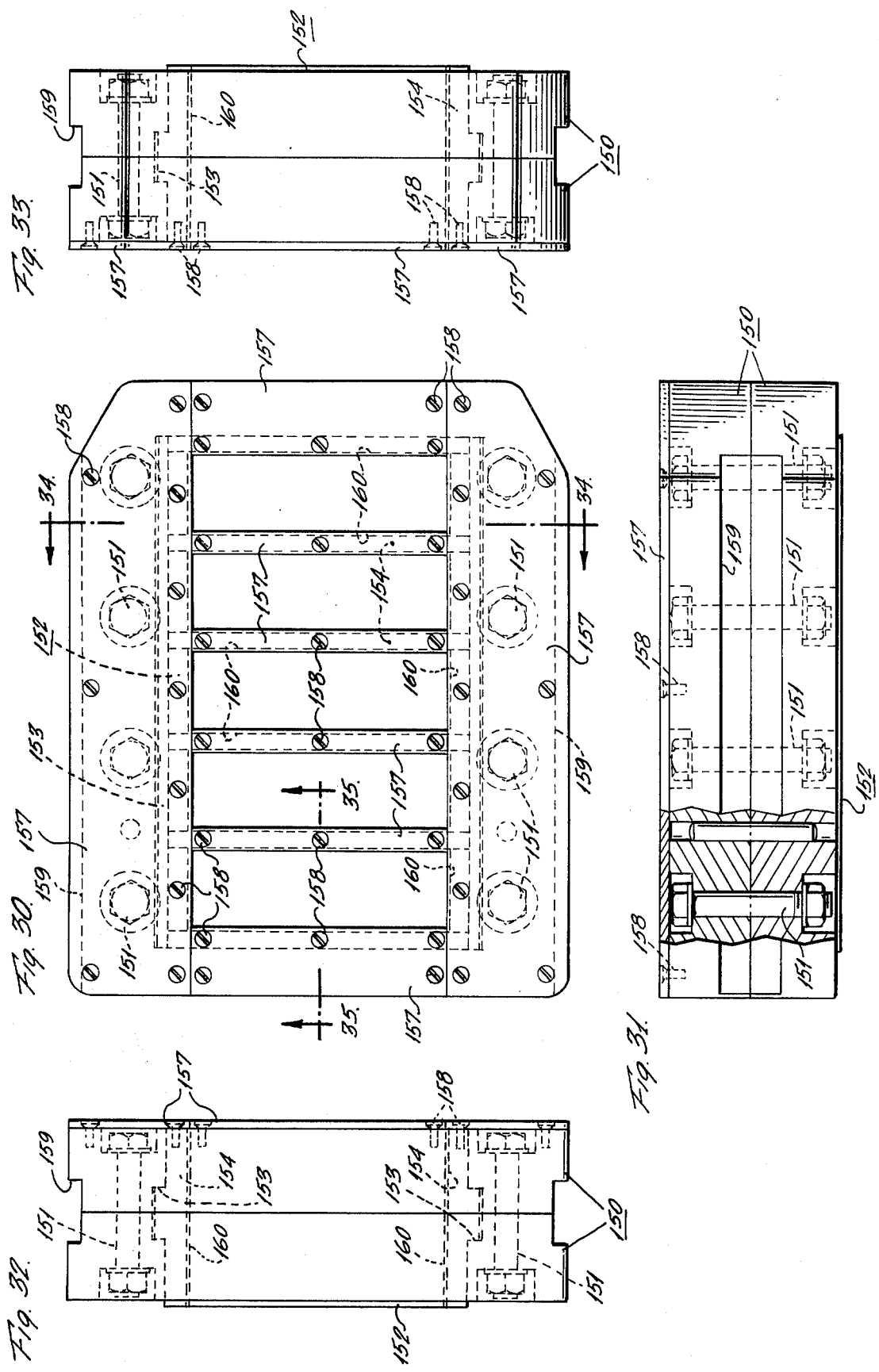

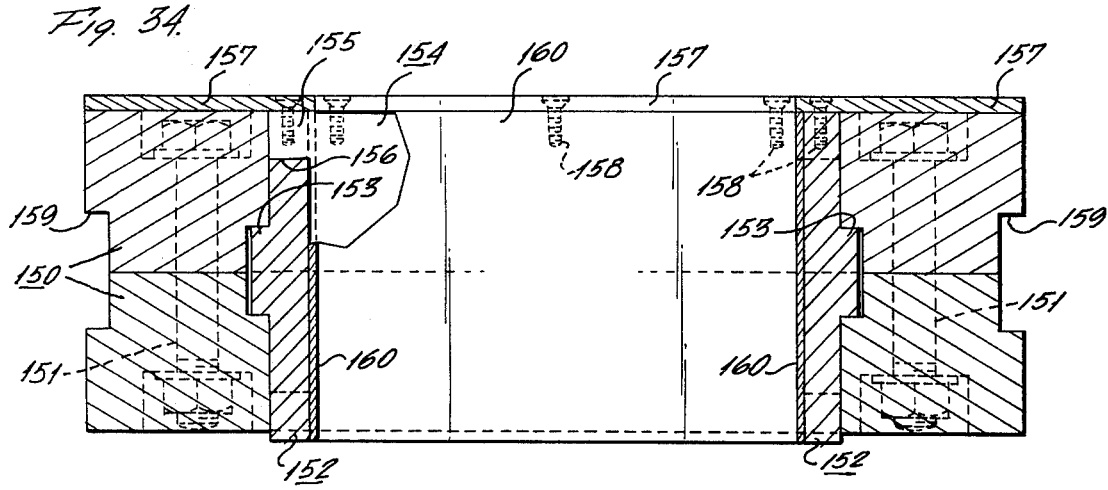
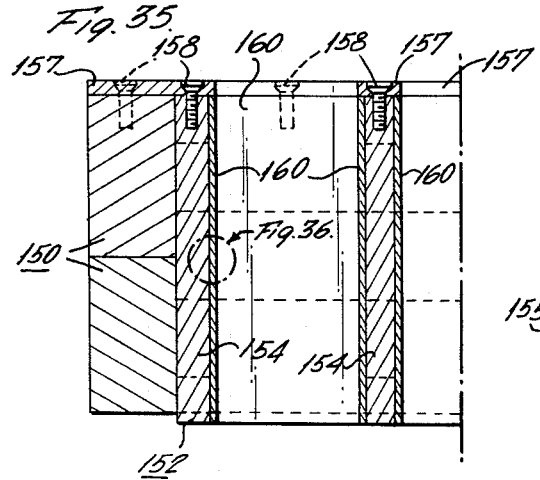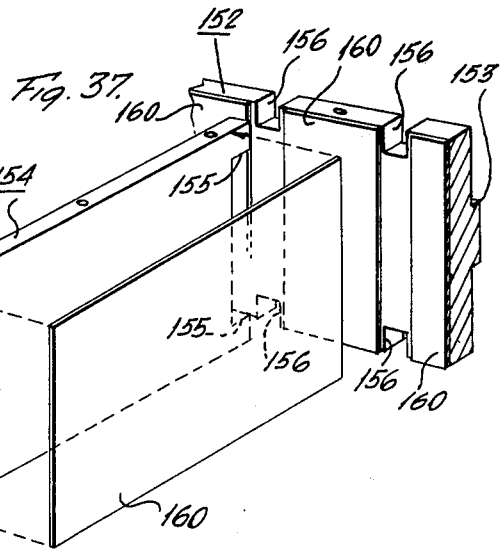
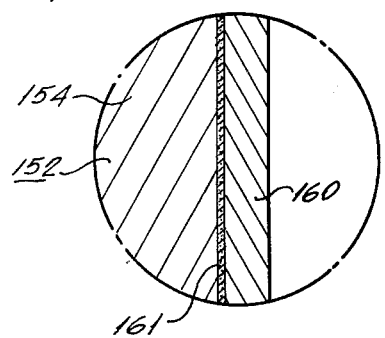

BRICK PRESS AND ASSOCIATED EQUIPMENT FOR MAKING BRICKS

The present application is a Continuation-in-part of our prior application Ser. No. 510,145, filed Sept. 30, 1974.

GENERAL FIELD AND OBJECTS OF THE INVENTION

The invention is concerned with the production of molded building components, especially molded bricks or blocks either of the solid type or the hollow type. The invention is concerned with techniques for making such bricks and provides an overall system for brick production, and especially an improved brick press.

One of the important general objectives of the invention is to provide a high capacity brick press.

A further objective of the invention is to improve the quality of the bricks produced, particularly with respect to the uniformity of compression and internal structure of the bricks.

Still further, the invention provides equipment for large scale brick production with a minimum of manual handling of either the material or of the bricks and also with a minimum of required personnel or attendants.

Another objective of the invention is to provide brick press equipment in which a multiple mold turntable is provided and in which mechanism is associated with the turntable for establishing a plurality of series of operating stations associated with the mold turntable and through which each mold is carried as the molds are advanced stepwise by the turntable. In the press equipment embodying a plurality of series of operating stations, the invention contemplates disposition of the several operating stations about the axis of the turntable in angularly spaced relation and in the preferred embodiment two series of operating stations are provided, with precompression, high compression and ejection stations in each series positioned in pairs at locations diametrically opposite to each other, in order to provide a balance of forces symmetrically about the axis of the turntable. This serves another objective, namely to make possible the employment of a press structure capable of operating at high compression and other loads, while maintaining the overall size and weight of the equipment at a minimum.

It is a further objective of the present invention to provide for concurrent precompression of the mold charges and for shifting of the mean or average position of the charge in the mold, as the precompression progresses. According to the invention, the precompression step is effected at a separate station of the turntable, in advance of the high compression stage or station, with consequent capability of increasing the rate of operation of the press mechanism, by utilization of the time interval between the precompression and the high compression operations to permit escape of air from the charge being compressed.

According to still another aspect of the invention, provision is made for automatic adjustment of the volume of the charge being delivered to the molds, in accordance with fluctuations in the dimension of the compressed component or brick in the direction in which the compressing force is applied.

In accordance with still another aspect of the invention, the press itself and also various of the associated components of the overall system or plant in which the press is incorporated, are arranged so that they may be employed in the production of bricks from various different materials, with a minimum of alteration of the components. For example, the brick press itself and also various of the associated materials preparation and feeding apparatus, may readily be employed in the production of sand-lime bricks, concrete bricks or blocks, or in the production of bricks formed of lateritic soils, for instance in the general manner disclosed in British patent specification No. 1,345,583, filed Mar. 22, 1971, or in forming bricks of any other material requiring high molding pressure.

Still another objective of the invention is the provision of brick press equipment having a mold turntable in which the brick molds may readily be changed in order to provide for the molding of bricks of various sizes and types. Similarly, in the equipment providing the molding stations, provision is made for convenient substitution of various press parts in order to cooperate with different molds, so as to make possible convenient and rapid change from production of bricks or blocks of one type to production of bricks or blocks of another type.

The invention also provides a novel arrangement of molds embodying readily replaceable lining or wear plates adapted to be secured in position in a novel manner and adapted also for quick replacement, as will further appear.

BRIEF DESCRIPTION OF THE DRAWINGS

With the foregoing in mind attention is now directed to the accompanying drawings which illustrate preferred embodiments of the invention, and in which:

FIG. 1 is an overall somewhat schematic isometric view of a brick production plant incorporating press equipment with the plant and press equipment constructed according to the present invention;

FIG. 1a is a diagrammatic view of a device for feeding brick coloring material into the system of FIG. 1;

FIGS. 2 to 10 inclusive are views illustrating a form of equipment for making solid bricks, these views illustrating the equipment according to the brief descriptions just below;

FIG. 2 is a plan view, with some parts in horizontal section, of a brick press constructed according to the present invention, and especially illustrating the mold turntable and showing the use of molds for forming groups of five plain or solid bricks, this view being taken as indicated by the section line 2—2 applied to FIG. 3;

FIG. 3 is a vertical sectional view of the press equipment taken as indicated by the section line 3—3 in FIG. 2 and illustrating the measuring, the mold charging, and precompression portions of the equipment;

FIG. 4 is a fragmentary plan section taken as indicated by the section line 4—4 in FIG. 3;

FIG. 5 is a view in vertical section of measuring and feeding devices employed in the equipment shown in FIGS. 2, 3 and 4;

FIG. 6 is an enlarged view of a device employed to adjust the size of the mold charge;

FIG. 7 is an elevational view of multiple prong press elements employed at the precompression stations of the equipment;

FIG. 8 is a view of a multiple pronged brick ejection press element employed;

FIG. 9 is a vertical sectional view of the press equipment taken as indicated by the sectional line 9—9 in FIG. 2 and illustrating the compression or high pressure press equipment;

FIG. 10 is a fragmentary vertical sectional view taken as indicated by the section line 10—10 in FIG. 2, and illustrating the ejection equipment employed;

FIG. 11 is a sequence of fragmentary views illustrating certain stages in the making of a brick, at various of the operating stations of the press;

FIG. 12 is a diagrammatic view of the stages of brick compression effected in accordance with FIG. 11;

FIG. 13 is an isometric view of a single brick prepared by the equipment as illustrated in FIGS. 1 to 11;

FIGS. 14 and 15 are diagrammatic views illustrating, by way of comparison with FIGS. 11 and 12, certain characteristics of bricks made in accordance with some prior art techniques;

FIGS. 16 and 29 inclusive are views illustrating a form of equipment for making hollow bricks, these views illustrating the equipment according to the brief descriptions just below;

FIG. 16 is a vertical sectional view through certain parts which may be employed in equipment such as shown in FIGS. 2 to 10 at the precompression stations, in order to produce hollow instead of solid bricks;

FIGS. 18, 19, 20, 21 and 22 are views of the equipment shown in FIG. 16 with various of the parts shown in different positions;

FIGS. 23, 24 and 25 are elevational views, with parts in section, showing equipment provided at the high compression station in the embodiment employed for the production of hollow bricks or blocks, these three views also showing parts of the equipment in different operating positions;

FIG. 26 is a vertical sectional view of parts shown in FIGS. 23, 24 and 25, taken on the irregular section line 26—26 applied to FIG. 25;

FIGS. 27, 28 and 29 are views illustrating certain parts shown in FIGS. 23 to 26, and taken as indicated by the section lines 27—27, 28—28 and 29—29 on FIG. 26;

FIGS. 30 to 37 inclusive are view illustrating a form of mold particularly adapted to use in press equipment according to the present invention, these views illustrating the equipment according to the brief descriptions below:

FIG. 30 is a plan view of a multiple brick mold;

FIG. 31 is an elevational view looking toward the lower edge of FIG. 30 and with a portion broken out and shown in section;

FIGS. 32 and 33 are end elevational views looking respectively toward the left and right hand ends of the mold structure as shown in FIG. 30;

FIG. 34 is a vertical sectional view taken as indicated by the section line 34—34 on FIG. 30 and particularly illustrating mold lining parts employed;

FIG. 35 is a partial vertical sectional view taken as indicated by the section line 35—35 on FIG. 30;

FIG. 36 is a greatly enlarged fragmentary sectional view taken as indicated by the circle marked 36 in FIG. 35 and particularly illustrating the arrangement for attachment of the mold lining;

FIG. 37 is a perspective view of certain parts of the mold structure particularly illustrating certain features of the mold lining arrangement;

THE OVERALL SYSTEM — FIG. 1

Figure 9:
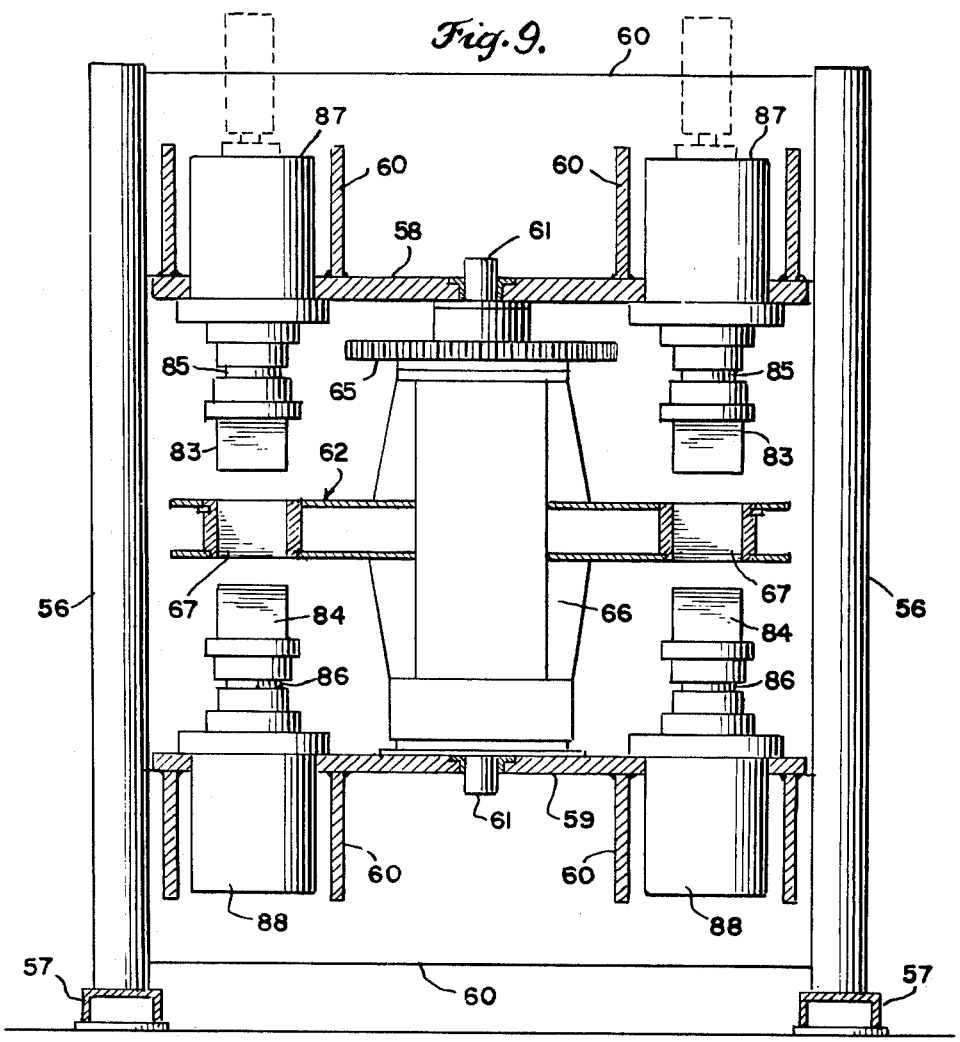
Figure 10:
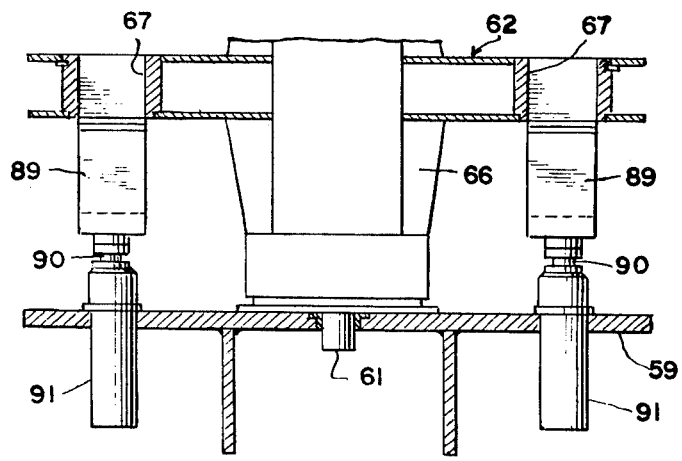

Although, as above indicated, the press equipment of the present invention may be used in a wide variety of systems for the making of bricks from various materials, the press equipment is particularly adapted to the making of bricks from materials at least in large part comprising granular constituents such as soil or sand, and the press equipment is particularly suited to the handling, compressing and molding of granular materials which are essentially free-flowing, i.e. which, notwithstanding the presence of some moisture, constitute a mass which will flow by gravity from a feeding hopper through a feed chute and into a charge measuring device.

Referring to FIG. 1, the press itself is somewhat diagrammatically indicated in outline at P. Other equipment shown in FIG. 1 comprises the equipment (shown toward the left of the press) for the preparation of the granular material to be delivered to the press molds, and the equipment (shown toward the right of the press) which is provided for the purpose of curing of the bricks made by the press.

Although, as above indicated, the press itself and also various portions of the system shown in FIG. 1 may be employed in the production of bricks of various granular materials, a typical example is the use of the equipment and the press in making bricks from lateritic soil according to the technique generally described in the British patent identified above. This particular use of the system shown in FIG. 1 is herebelow briefly described by way of illustration.

Before considering the system of FIG. 1, it it also pointed out that the individual components, except for the press itself, are all of known type and need not be considered in detail herein. They are illustrated only diagrammatically or in outline and are described only generally, as the details of the construction of the individual components forms no part of the present invention per se.

Lateritic soil is delivered to the system through the grate of the dump hopper 25 and the soil then falls by gravity into a preliminary grinding mill 26 for the purpose of breaking up lumps. A bucket conveyor 27 raises the preliminarily ground material to the inlet of the drying tumbler 28, an air lock 29 being provided between the conveyor 27 and the tumbler 28. An air heater 30 circulates air into the tumbler 28 from which the moisture laden air may be discharged through the outlet 31. The tumbled and dryed material drops into the feed device 32 which delivers the material into a rod mill or a swing mill 33 provided for breaking up the lumps and particles into granules of whatever size is desired in the preparation of the granular material to be charged into the molds. The material is discharged from the mill through a rotating screen into a bucket conveyor 34, the upper end of which is associated with a dust collector 35 and also with a granule feed chute 36 delivering the material into the hopper or silo 37.

An additive for developing a binder in the bricks may be introduced into the system through the grate 38 into the lower end of the bucket conveyor 39 which carries the additive up to the hopper or silo 40. In making bricks from laterite, this additive should be lime, as is disclosed in the British patent above identified.

Weighing or measuring equipment 41 receives material from the hoppers 37 and 40 and delivers these materials in appropriate proportions into the mixer 42. Water (together with other additives, if desired) is introduced into the mixer 42 through the supply line 43 which is supplied by the measuring pump 44. The mixture is then carried by the bucket conveyor 45 upwardly for discharge into one or another of the storage silos indicated at 46. From these silos, the material is delivered by a conveyor 47 into a final mixer 48 which discharges the material onto the conveyor belt 49 for delivery to the press hoppers 50 and 51. Bricks made by the press may be carried by pallets 52 into the curing equipment or chambers indicated at 53.

The final mixer 48 may be used to introduce other additives or water. For example, coloring material such as pigment may be introduced by a feeding and measuring unit such as illustrated diagrammatically at 42a in FIG. 1a. Here a vibratory screw 42c receives the coloring material from the hopper 42b and delivers the material at a steady rate through the discharge connection 42d which delivers into the mixer 42 as indicated in FIG. 1.

Before analyzing the construction of the press itself, it is noted that in the system in FIG. 1 the soil is dryed before introduction into the mill 33 and this is desirable for purposes of operation of the mill, and in addition it is also desirable to bring down the level of moisture in the material taken for use so that the moisture content may more readily and accurately be adjusted and brought to the desired value by the addition of water delivered into the mixer 42 by the pump 44.

The capacity of the silos 37 and 40 need only be sufficient to supply mixer 42 for a short time, for instance, one-half hour, but it is preferred that the storage silos 46 provide sufficient capacity for storage for at least several hours which is desirable in the handling of various granular materials in which additives and binder-forming constituents are introduced. This time interval of storage assists in preparing the material for the subsequent precompression and compression operations effected in the press equipment itself.

In the production of bricks from lateritic soil, lime and water, it is contemplated that the curing chambers 53 be maintained at a temperature of the order of 97° to 98° C. and at atmospheric pressure, with a humidity close to saturation, for instance, upwards of about 95% relative humidity. Since air is used for drying the material in the tumbler 28, the resultant humid air may be circulated from the tumbler through the connection 54 to the curing chambers 53. If desired, additional moisture may be introduced into this air by a humidifier indicated at 55.

When making lateritic bricks it is ordinarily desired to maintain the bricks at the curing temperature and at the high humidity for a number of hours, for instance 20 hours, and in view of this, it is contemplated that the curing station 53 comprise a number of chambers providing reasonable capacity for brick storage during the curing operation.

It will be understood that when the brick press of the present invention and the system shown in FIG. 1 is employed for the making of other types of bricks, for instance, sand/lime bricks, the humidified atmospheric pressure curing chamber 53 may be replaced by appropriate autoclaves, as ordinarily employed in the production of sand/lime bricks. In this case, some other changes in the system may be desired, but many of the components and system connections may remain the same as illustrated and described.

COMPONENTS FOR MAKING SOLID BRICKS — FIGS. 2 TO 10

In considering the press mechanism, attention is first directed to FIGS. 2 through 10 inclusive which illustrates the general structure of the press and also shows the manner of use of the press with multiple molds, for example, molds in which each mold has five cavities for forming solid bricks. It is to be understood that the general structure of the press is adapted for use not only with molds for forming solid bricks, but also for molds for forming hollow bricks, which latter are shown in detail in the sequence of figures beginning with FIG. 16.

Although the press may have a frame or base structure constructed in various ways, in the embodiment as illustrated in FIGS. 2 to 10, the frame structure is made up of tubular vertical posts or columns 56 having base or support channels 57 and upper and lower horizontal frame plates such as shown at 58 and 59 interconnecting the posts 56. Transverse webs 60 may also be provided, together with any other desired interbracing elements. The upper and lower horizontal frame elements 58 and 59 serve to mount the rotatable shaft 61 which carries the turntable indicated generally at 62 which is rotated in the direction indicated by the arrow in FIG. 2 by any suitable motor driven shaft 63 carrying pinion 64 meshing with gear 65 which is connected with the shaft 61. Appropriate axis structure 66 serves to mount the turntable on the central shaft 61.

The turntable is provided with apertures or cavities adapted to receive any desired type of mold. There are hereshown a series of molds or mold devices indicated at 67, in the embodiment illustrated there being six such mold devices angularly spaced about the axis of the turntable 62, so that the mold devices lie in radial planes at 60° from each other.

In the equipment shown in FIGS. 2 through 10, mechanism is provided including reciprocable press elements arranged to define a plurality of operating stations angularly spaced from each other about the central shaft 61 of the turntable and providing for various of the operating steps or functions above briefly referred to. In analyzing the equipment provided for establishing the operating stations, it is first pointed out that the operating stations contemplated according to the present invention include a mold charging and precompression station, a high pressure mold station, and a brick ejection station. In the embodiment illustrated, there are two series of such operating stations associated with the mold turntable. Thus, there is a total of six operating stations around the axis of the turntable and since there are six molds carried by the turntable, a mold is available for each of the operations performed in all three of the operating stations of each of the series thereof. Since the series of operating stations is duplicated, only one of the series need be described in detail and for that purpose reference is made to the left hand portions of FIGS. 2, 3, 9 and 10, as well as, to some of the corresponding parts as shown in FIGS. 4, 5, 6, 7 and 8.

Toward the left in FIGS. 2 and 3, a dot-dash line indicates the material supply hopper 50 (see also FIG. 1).

The bottom of this hopper has a chute 68 which delivers the granular material first into the measuring and transfer equipment described just below and then into the molds.

A vertical shaft 69 is rotatively mounted in a position just beyond the periphery of the turntable 62, this shaft carrying a spider or hub structure 70 which, in turn, carries measuring mold parts 71, the upper portions of which are telescoped with cooperating measuring mold parts 72 mounted on a disc or plate 73. The upper and lower portions of the measuring molds may be telescoped to a greater or lesser extent, thereby adjusting the size or volume of the charge received by these measuring devices. At a plurality of points spaced around spider or hub structure 70, jack screws 74 are provided (see FIG. 6) whereby the upper and lower parts of the measuring devices may be adjusted and fixed in adjusted position. Below the lower ends of the parts 71 of the measuring devices, plate 75 is provided in the plane of the top surface of the turntable 62 (see FIGS. 3 and 4) which serves to close off the lower open ends of the measuring devices.

This assembly of measuring parts 71 and 72 constitutes a secondary turntable cooperating with the mold turntable 62, and the shaft 69 of the secondary turntable may be turned, for instance, in the direction indicated by the arrow in FIG. 2, as by a motor 76 whose operation is timed with other control functions as later described, so that periodically a charge of material delivered from the hopper 50 into one of the measuring devices 71-72 is carried from the loading position into position over the turntable 62 so that delivery of charges of the granular material into the molds may be effected under the influence of the precompression piston elements to be described. Instead of being rotated or turned by a motor as indicated at 76, the shaft 69, and the measuring devices 71-72 may be periodically oscillated as by means of a pair of piston and cylinder devices.

As with the molds carried by the turntable, in the embodiment illustrated, the measuring devices 71-72 are each provided with five cavities, so that individual charges of the granular material to be molded are carried from the measuring or loading position below the hopper 50 to the mold charging position over the turntable 62.

As above mentioned, the mold turntable 62 is provided with a plurality of molds 67 arranged around the turntable, and the associated equipment establishes two series of three press stations, and for convenience in the following description, one of these series of press stations is identified by the letters A, B, and C. The second similar series is identified by the letters A', B' and C'.

Press station A, see particularly FIG. 3, is a mold loading and precompression station and, when using molds for making solid bricks, this station is established by the provision of a pair of press plungers 77 and 78, each of multiple prong construction, (see FIG. 7), so that a press plunger prong is provided for each brick cavity in the mold. These press plungers are carried by piston rods 79 and 80 adapted to be operated by pistons working in hydraulic cylinders 81 and 82. By means of these press elements the charge of granular material carried by the measuring devices 71-72 is delivered into each mold 67 as it reaches station A and is subjected to precompression therein in the manner described hereinafter with particular reference to FIGS. 11 and 12.

Mold station B comprises a high compression molding station and as seen in FIG. 9 is established by a pair of press plungers 83 and 84 carried by piston rods 85 and 86 adapted to be operated by pistons provided in hydraulic cylinders 87 and 88. These press elements (83 and 84) are also desirably of multiple prong construction in order to cooperate with the multiple cavities of the mold. The operation of these press elements will also be described hereinafter with reference to FIGS. 11 and 12.

The third press station C (see FIG. 10) is established by an ejection or striper mechanism 89 carried by a piston rod 90 actuated by a piston in hydraulic cylinder 91. The device 89 is also of multiple prong construction as will be seen from FIG. 8, but in this instance, various prongs are of different length so that upon actuation of the ejection mechanism, the bricks are loosened and displaced sequentially, thereby reducing the force required to operate the ejection mechanism. The ejection mechanism is also referred to hereinafter in connection wth FIG. 11.

It will be understood that similar press and ejection mechanisms are employed in order to establish the press stations identified by the letters A', B' and C'. Moreover, as will be seen from FIGS. 2 and 3, it will be understood that the mold loading and precompression station described above with particular reference to FIGS. 2, 3, 4, 5 and 6 is duplicated in a position to cooperate with station A' which is the loading and precompression station of the second series of stations.

Referring further to FIGS. 2 to 10 inclusive, it will be seen that in the two series of press stations established about the axis of the turntable 62, the two loading and precompression stations are located symmetrically with respect to the axis of the turntable at 180° from each other, as are the two high pressure stations and the two ejection stations. In consequence, the forces and reactions between upper and lower press members and other forces applied not only to the structure establishing the several press stations but also the turntable itself and the molds are all symmetrically balanced about the axis of the turntable, in view of which adequate strength is provided with a minimum of weight and structure of the mounting mechanism as well as in the turntable.

It is desirable that the turntable be accurately positioned at each operating position and for this purpose, a mechanism is provided (see FIG. 2) comprising a reciprocable plunger 92 operated for example by a hydraulic cylinder 93, the plunger is adapted to be received in a socket such as indicated at 94 arranged in the periphery of the turntable 62. Such a socket is provided between each pair of adjacent molds around the turntable, as is shown in FIG. 2.

ANALYSIS OF BRICK COMPRESSION — FIGS. 11 to 15

Figure 11:
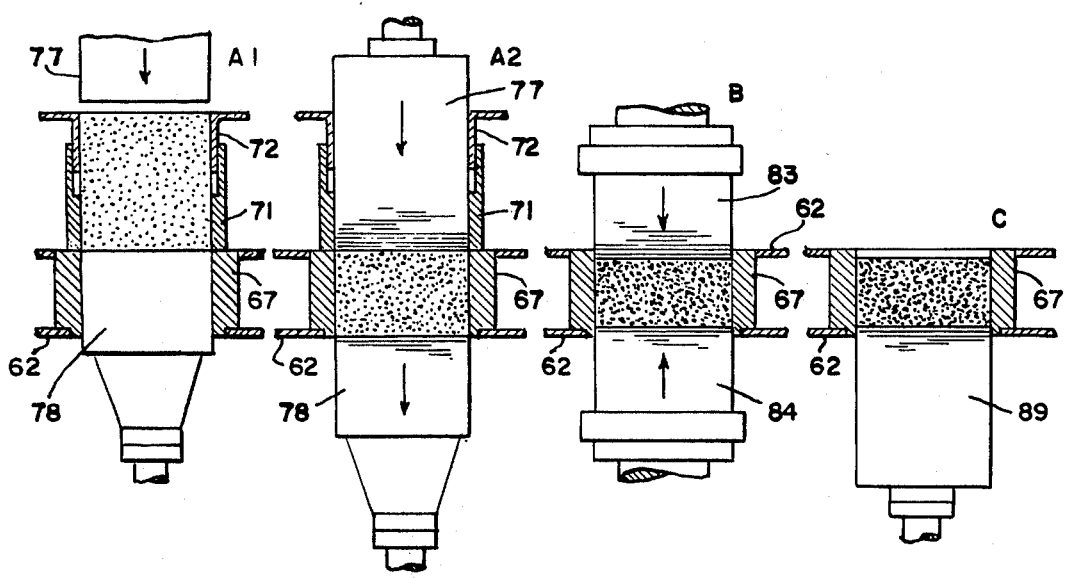
FIGS. 11 to 15 inclusive illustrate bricks prepared in accordance with the present invention, particularly in the form of solid bricks, as produced by the equipment of FIGS. 2 to 10 inclusive, and comparing certain characteristics of those bricks with corresponding characteristics of prior art bricks, these figures individually being as follows.

In FIG. 11 the press stations are indicated and portions of the press elements shown in certain positions. In the first two portions of FIG. 11 marked A1 and A2, the parts are shown in two different positions at the loading and precompression station A. The high compression and ejection stations are indicated by the letters B and C respectively.

In the sequence of views shown in FIG. 11 only a single brick cavity of the mold is shown, but it will be understood that the same operations will occur for each brick cavity.

As shown at A1 in FIG. 11, the press member 78 has been advanced upwardly through the mold 67 to a position where the top of the press member is at the same level as the top of the turntable 62, i.e., up to the upper end of the mold 67. The press plunger 77 is shown just before engagement with the charge of material in the measuring device 71-72. Referring next to the condition shown in A2, it will be seen that the press member 78 has moved downwardly to a position at the bottom of the turntable, i.e., at the bottom end of the mold 67, and in addition, the upper press plunger has descended to bring its lower face down through the measuring device 71-72 to the upper face of the turntable, i.e., to the upper end of the mold. In moving from the positions shown in A1 to the positions shown in A2, it will be observed that the press plunger 77 has moved to a greater distance than the press plunger 78. In consequence of this, not only has the charge of material been transferred from the measuring device 71-72 into said mold, but in addition, the charge of material has been compressed.

After withdrawal of the precompression press elements 77 and 78 and advance of the turntable to carry the mold from station A to station B, the high compression press members 83 and 84 now enter the top and bottom of the mold as shown at B in FIG. 11. This subjects the charge to additional compression.

After withdrawal of the press members 83 and 84 and further advancement of the turntable 62, the press ejection station is reached and at this point the ejection device 89 moves upwardly into the mold and ejects the brick through the upper open end of the mold to a position on the top of the turntable, and from this point the bricks are taken away, for instance by stacking on pallets or the like for delivery into a curing chamber, as briefly described above with reference to FIG. 1.

The foregoing loading, precompression and high compression stages of the press operation have certain important advantages which are explained just below with particular reference to FIGS. 11 and 12, the latter of which shows comparative stages of shifting movement and compression of the charge of granular material in a given mold.

First note that the overall or total compression of the charge is divided into two stages of compression, one of which, the precompression stage accomplished at station A, is of much greater extent than the latter, which is accomplished at station B. This is of advantage and importance because it is only in the final portion of compression in which very high pressures are needed, and such high pressures are much more economically and readily obtained with a very short press stroke. In the precompression stage a greater stroke is needed, but the pressure need not be as high.

In this way, a similar interval of time of press operation may also be utilized for both the precompression and high compression stages of the brick molding, and this is desirable in order to attain conditions permitting minimum time at each press station, with consequent increase in production with a given press.

It is also of advantage that in the system of the present invention the precompression and high compression steps are effected at angularly spaced stations, so the precompression press elements 77 and 78 disengage the precompressed charge, and the charge in the mold travels from one station to another, before the high compression press element 83 and 84 come into engagement with the precompression charge. These operating conditions provide opportunity for release or escape of air from the precompressed charge, thereby shortening the time required for air release or escape and permitting corresponding increase in speed of operation.

In a typical press operating in the manner just described, a pressure of about 20 kg/cm$^2$ may be developed in the precompression station, with a reduction of the volume of the charge to about two thirds of the original volume in the measuring device; and in the high compression station a pressure of between about 100 to 400 kg/cm$^2$, for instance 300 kg/cm$^2$ may be attained, with a volume reduction down to about three-quarters of the volume following the precompression stage.

Each step of the operation may be accomplished in a total press stroke time of 4 seconds, which time is made up of 1½ seconds for turntable turning time and 2½ seconds for the hydraulically induced motions of the press members.

Figure 12:
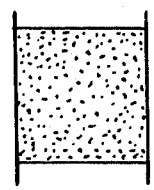
Figure 14:
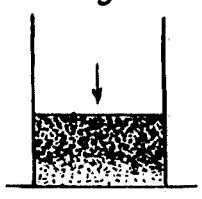

In addition to the foregoing advantages, the sequence of operations represented in FIGS. 11 and 12 has another important advantage which is related to the uniformity of the bricks produced. This matter can best be explained by reference to certain alternative operations which are diagrammatrically represented in FIGS. 14 and 15. FIG. 14 indicates a condition of compression of granular material in a molding operation where the entire compression of an initial charge of the same volume as in FIG. 11 is accomplished by the movement of one piston into the upper end of a mold.

Because of certain known behavior tendencies of granular materials placed under pressure in a mold, the application of the pressure to compress the charge by only a single moving press plunger has a tendency to concentrate the compression in the volume of the charge adjacent to the moving press member. In consequence, the compression is not uniform throughout the depth of the charge being compressed and this non-uniform compression is indicated in FIG. 14 by the heavy stippling in the upper portion of the brick and the lighter stippling in the bottom portion. The extent to which this graduation of the compression takes place is dependent upon the length of the stroke with respect to the mold wall in order to effect the compression. It will be noted in connection with FIG. 14 that the upper portion of the compressed charge has experienced extensive downward movement with respect to the side walls of the mold, and that the lower portion of the charge has experienced little, if any, downward motion with respect to the side walls of the mold. The difference in compression of the upper and lower portions of the charge is directly related to the motion of the charge with respect to the mold walls. The tendency to stratify is accentuated where the particulate material is fine grained.

Figure 15:
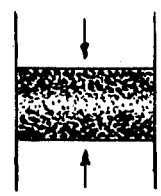

In FIG. 15, there is illustrated a system in which the compression of the charge is effected by motion of two press elements, one above and the other below the charge, but in which the entire compression is effected by equal and opposite press strokes of two press elements. In this case, both the uppermost layer and the lowermost layer of the charge will have considerable motion with respect to the side walls of the mold, but because of the length of the strokes both the uppermost layer and lowermost layer will experience much greater compression and will be of greater density than the intermediate layer. This is indicated in FIG. 15 by the heavy stippling in the uppermost and lowermost layer and the lighter stippling in the intermediate layer.

While the arrangement of FIG. 15 results in less pronounced stratification than FIG. 14, FIG. 15 also produces considerable stratificaton in the texture of the compressed charge and from the standpoint of uniformity of strength of the product, this stratification is disadvantageous. The foregoing difficulty is in large part eliminated by the sequence of press operations described above in connection with FIG. 11. From FIGS. 11 and 12, it will be seen that during the precompression state A, which represents the largest portion of the compression volumetrically, all of the material of the charge is being moved with respect to the mold walls, and we have found that this largely eliminates the stratification tendencies in this phase of the operation. The remaining compression which occurs in high compression stage B of the press operation represents only a very small reduction in volume from the precompressed stage, and in view of this, much less stratification occurs.

From the foregoing, it will be seen that most of the compression of the brick is carried out while the charge is being moved downwardly along the surfaces of the measuring device 71-72 and of the mold 67. We have found that the bricks produced in this manner, manifest more uniform strength characteristics throughout the internal structure of the bricks even when vary fine grain material is used.

Figure 13:
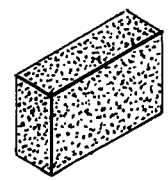

In FIG. 13 a brick is isometrically illustrated in the typical shape as ejected by the mechanism 89 at press station C.

PRESS CONTROL

Since the turntable may be turned and the press elements actuated by any desired controls or control system, it is not thought necessary herein to described the details of such controls. However, several points may be noted, as follows The mold turntable 62 which is adapted to be rotated by the gear 65 meshing with pinion 64 in turn driven by the pinion shaft 63 which may comprise the power shaft of any suitable motor operator intermittently in order to advance the turntable stepwise and bring the molds sequentially to each press station.

COMPONENTS FOR MAKING HOLLOW BRICKS — FIGS. 16 to 29

The general structure of a brick press may be arranged to accommodate molds and press elements for making solid bricks, as above described, or may be arranged to accommodate molds and press elements for making hollow bricks, or may be arranged to alternatively accommodate either kind of molds and press elements. In any event, various molds and press elements as shown in FIGS. 16 to 29 are preferably employed when it is desired to make hollow bricks or blocks. Cetain hydraulic cylinders shown in FIGS. 16 to 29 are also indicated in dotted outline in FIGS. 3 and 9.

Figure 17:
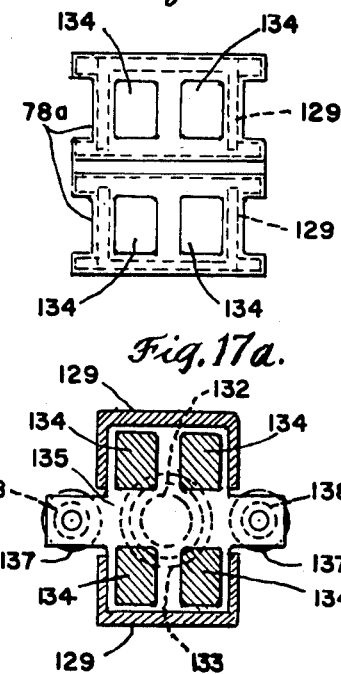
FIGS. 17, 17a and 17b are transverse views taken as indicated by the lines 17—17, 17a—17a, and 17b—17b in FIG. 16.
Figure 17A:
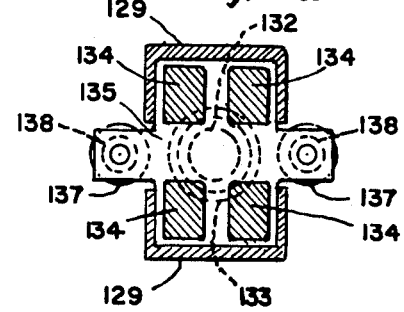
Figure 17B:
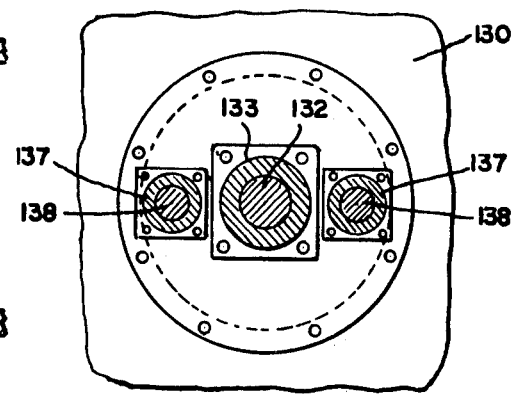

The shape of one form of hollow block which may be made will be clear from FIGS. 17 to 29. A pair of such blocks will be seen in cross section in FIG. 29, and the shape of precompression elements for making such blocks is illustrated in FIG. 17, and the shape of corresponding high compression elements is shown in FIG. 27.

Because of the fact that the bricks here being made have interior cavities, it is necessary to use press or mold equipment in which cores are employed in order to define the interior cavities of the hollow bricks. Also, in order to effect compression of the particulate material of the bricks, it is necessary to employ press elements which are configured to conform with the cross section of the hollow bricks, as is seen in FIGS. 17 and 27.

Equipment incorporating such cores is shown in FIGS. 16 to 29 inclusive and in this series of figures, only certain of the press and turntable parts are shown. Thus, the mold turntable is indicated at 62, as in FIGS. 2 to 10, but only one of the series of molds is shown in FIGS. 16 to 29. The mold structure here shown at 67a is shaped to define the outside contours of a pair of bricks or blocks of the kind shown in FIG. 29, instead of the molds of FIGS. 2 to 10 which provide for making five solid bricks at each station. Since two hollow blocks are here being formed a divider 67b is positioned in the mold between the two blocks (see FIG. 16a).

FIGS. 16 to 22 inclusive, indicate a sequence of positions of parts occurring in the precompression molding station, for instance a station corresponding to station A as fully described above in connection with FIGS. 2 to 10 inclusive. At this precompression station, the upper press components comprise a hydraulic cylinder from which the piston rod 126 projects downwardly to carry the generally rectangular press element 127, having a lower pressing surface adapted to overlie the entire upper end of the hollow blocks being made.

The press components which are mounted below the turntable comprise both core members to define the cavities in each block and also press elements configured to engage the lower end surface of the blocks around the cavities. The press elements are shown at 78a not only in the vertical sectional views of FIGS. 16, 16a and 18 to 22 but also in the plan view of FIG. 17. The various portions of this press element 78a are mounted upon a pair of spaced vertical plates 129 which extend downwardly, with their lower ends fastened to opposite edges of the cross plate 131 which is connected with the piston rcd 132 extended from the upper end of the hydraulic cylinder 133, which cylindeer is mounted on fixed press structure and which effects and controls the upward and downward movement of the press element 78a in accordance with cycles of operations to be described herebelow.

The lower press elements at the precompression station further include the core members 134 each of which serves to define and form one of the two cavities in one of the hollow bricks being made. These core members are connected at their lower ends with the mounting plate 135 and a pair of hydraulic cylinders 137 mounted on the fixed press structure 130 have upwardly extending piston rods 138, the piston rods in turn being connected with the mounting plate 135 for the cross 134.

By the mechanisms above described, the cores 134 are vertically movable within the parts of the press elements 78a, and the various movements of the cores and press elements are controlled in the manner to be described below.

Figure 16A:
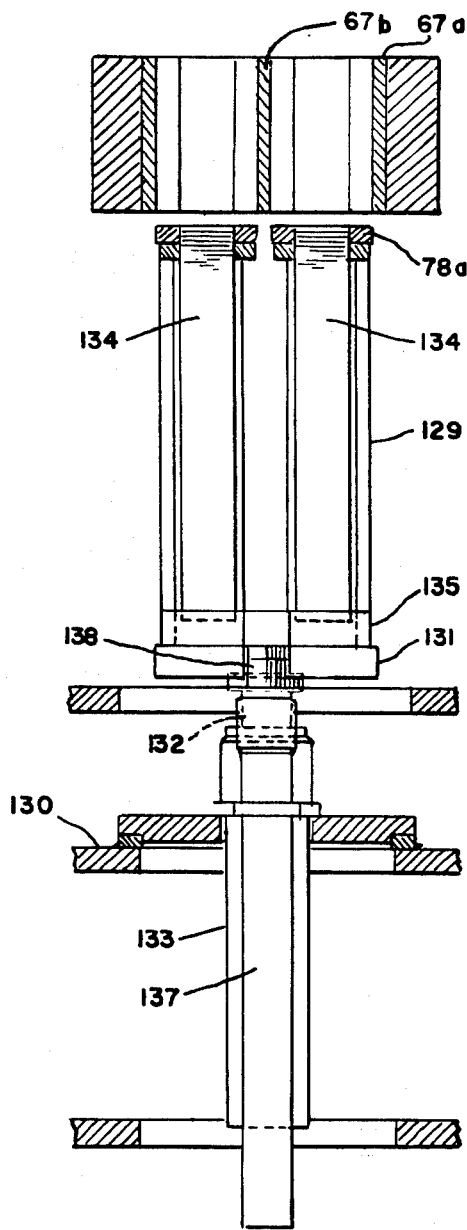
FIG. 16a is a vertical sectional view of the structure shown in FIG. 16 but taken in a plane at right angles to FIG. 16.

It is first pointed out that at the precompression station represented in FIGS. 16 to 22, as in the first embodiment described above, a measuring and charging mechanism is provided in order to introduce a measured charge of particulate material into each mold as it is carried into the precompression station of the press. This measuring and loading equipment is only diagrammatically indicated in FIGS. 16, 16a and 18 to 22, the numeral 71a being applied to the diagrammatic showing of the measuring device. In FIG. 16, with the measuring device 71a offset toward the left, there is also a dot and dash indication at 50 of a particulate material feed hopper which may be employed in the manner described above for the loading of the measuring device 71a.

Referring now specifically to the sequence of operations represented by FIGS. 16 and 18 to 22, it is first noted that in FIG. 16, the upper press member 127 is in an upper position above the upper level of the measuring device 71a, and the cores 134 are in the lower position, below the lower end of the mold 67a. In addition the lower press element 78a is also positioned with its upper end below the mold.

Figure 19:
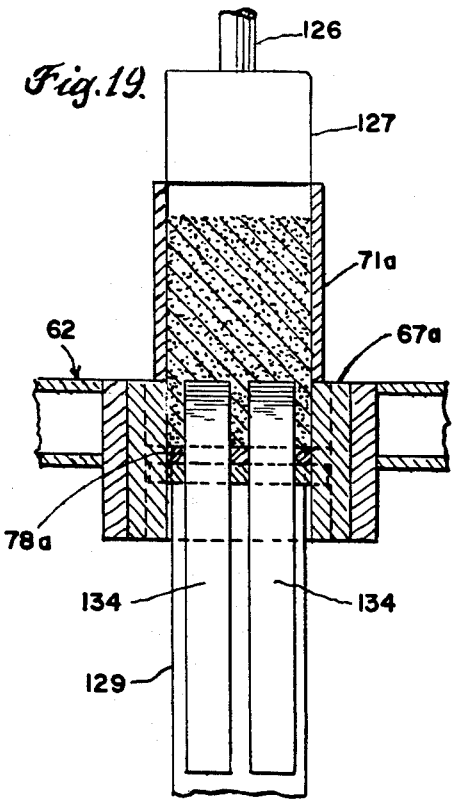
Figure 20:
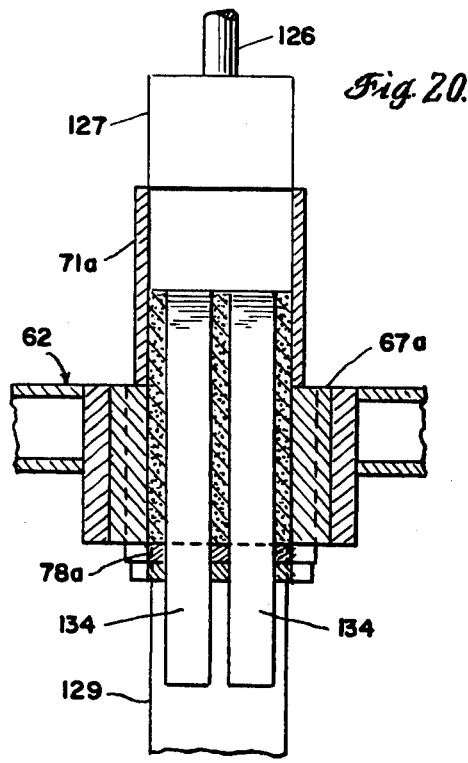
Figure 21:
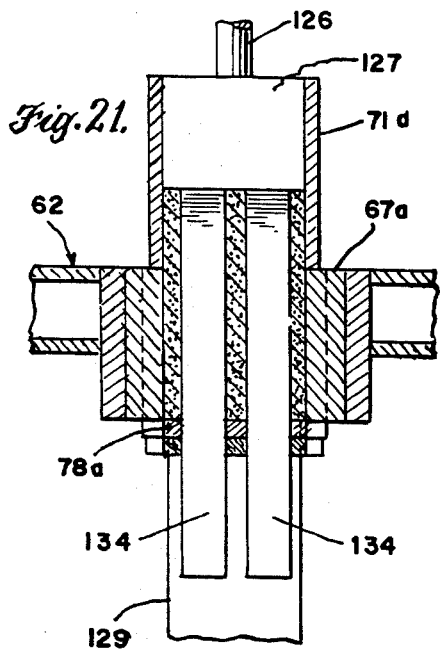
Figure 22:
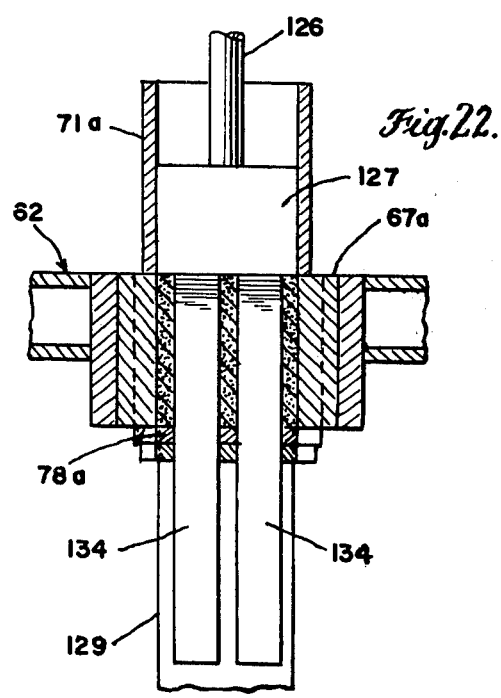

Referring now to FIG. 18, as the measuring device 71a containing the charge of particulate material to be introduced into the mold approaches a position overlying the mold, both the cores and the press element 78a are elevated sufficiently to enter the mold and bring the upper surface of the cores and press element to the plane of the upper surface of the turntable 62, to thereby close the mold cavities. This position is maintained until the measuring device 71a has moved to a position between the upper element 127 and the lower parts as just described. Thereafter, the press element 78a commences its downward motion, as indicated in FIG. 19, but the cores remain in an upper position. The lowering of the press element 78a permits portions of the charge in the measuring device 71a to drop into the spaces between and surrounding the cores. The cores are now raised, as indicated in FIG. 20, part way into the measuring device 71a. At the same time the press element 78a is lowered to the bottom of the mold as shown in FIG. 20, and at this time a large part of the charge of particulate material has been transferred into the mold in the spaces between and surrounding the cores, but the particulate material has not yet been compressed. The upper press element 127 is now brought down to the cores, as shown in FIG. 21, and with the upper ends of the cores in contact with the upper press element 127, the cores and upper press element descend toward the mold and the lower press element 78a remains in its position at the lower end of the mold. The action of the descending upper press element 127 subjects the charge of material to the desired precompression. This precompression stroke continues unitl the position shown in FIG. 22 is reached. Thereafter, the upper press member 127 is withdrawn upwardly and the cores 134 are withdrawn downwardly after which the mold with the precompressed hollow blocks therein is advanced by the turntable to the high compression station which is preferably equipped with press components of the kind described below.

The arrangement of the components employed at the high compression station when making hollow bricks also includes core elements in addition to the press elements, but these elements are differently arranged than the corresponding parts at the precompression station. Some of the chief differences include the fact that the piston and cylinder devices for the core elements and the press elements are arranged so that the cylinders for the core elements and the cooperating press elements are coaxial, the piston rod extended from one of the cylinders being extended through a hollow piston rod which is extended from the other cylinder. The manner in which this is arranged is explained hereinbelow with particular reference to FIGS. 23 to 26.

Referring now to FIG. 23, it will be seen that the lower high pressure cylinder and piston device 88a is arranged below the mold turntable 62, and the piston rod 86a of this device carries a press member 84a having a top surface with an area extended through the entire area of the cavities in the mold structure 67a, including both the area of the cavities in the bricks being formed and also the area of the brick material surrounding the brick cavities.

Above the mold table 62 core members 139 are provided, there being a core member for each of the two cavities in each of the two bricks being formed in the particular embodiment illustrated. These core members are caried by a mounting structure 140 which is connected with the lower end of the piston rod 141 which extends downwardly out of the core actuating cylinder 142, mounted on a frame part 143. The upper high pressure cylinder 144, mounted on framing at 145, has a piston with a piston rod 146 which is hollow, the piston rod 141 being extended through the piston rod 146, as clearly appears.

The hollow piston rod 146 carries a structure 147 at its lower end to which the various parts of the high compression press elements 148 are connected. These press elements being arranged in a pattern conforming with the cross section of the hollow bricks themselves, as appears in FIGS. 27 and 29.

In FIG. 23 the cores 139 and the piston elements 84a and 148 are shown positioned slightly above and below the upper and lower ends of the mold structure carried by the turntable 62, and this position of the parts represents the position as the mold structure is carried by the turntable from the precompression station A to the high compression station B.

In FIG. 24 the cores have been advanced downwardly into the cavities in the precompressed bricks, and the lower and upper press elements 84a and 148 have been advanced just to the point of engagement with the bricks in the mold structure.

In FIG. 25 the lower press element 84a has advanced upwardly somewhat, the cores 139 being correspondingly shifted upwardly, and the upper press structure has advanced downwardly into the mold structure, thereby effecting the final and high compression of the bricks.

Thereafter, as will be understood, the upper press structure and the cores will be withdrawn upwardly and the lower press structure will be withdrawn downwardly, so that when the turntable carries the mold to the ejection station C, the bricks may be ejected in the same general manner as described above in connection with FIGS. 2 to 10.

With regard to the arrangement of the parts of FIGS. 23 to 29, it is pointed out that the use of coaxial cylinders with telescoping piston rods, for actuating cores and press elements may be employed, if desired, for precompression at station A, in which event these coaxial cylinders would be positioned below the turntable, instead of above the turntable. However, it is preferred to use the core and press element actuating arrangement of FIGS. 2 to 10 at the precompression station, because the coaxial disposition of the cylinders necessitates a greater vertical height to accommodate the actuating cylinders, and for most installations it is preferred not to elevate the turntable sufficiently above normal ground or floor level to accommodate the coaxial cylinder arrangement. At the high compression station, however, since the cooperating core and press element cylinders may be arranged above the turntable, it is preferred to employ the coaxial arrangement, and it will be noted that such coaxial arrangement, with the cylinders above the turntable, does not require undue elevation of the turntable. The coaxial arrangement also has distinctive advantages in that it provides symmetry of distribution of forces incident to operation of the core and press cylinders, and this is particularly important at station B, because this is the high compression station in which the highest press forces are generated.

With respect to all embodiments and especially to the embodiment of FIGS. 16 through 29, it is contemplated that some provision be made for vibration or for intermittent movement of press elements in small increments, in order to promote transfer of charges from the measuring devices into the molds, and also to enhance the uniformity of compression.

MOLD WITH REPLACEABLE LINING PLATES — FIGS. 30 TO 37

The mold structure, with replaceable wear plates or liners, as illustrated in FIGS. 30 to 37 and as described herebelow is useable in the press equipment already described above and this form of mold equipment represents a preferred embodiment of such equipment for use in the press mechanism herein above described.

This mold structure comprises an outer frame which is horizontally split into upper and lower halves 150—150, the two halves being provided with bores through which fastening bolts 151 extend in order to separably connect the two halves together. An inner frame formed of pieces such as indicated at 152 is provided within the outer frame 150—150, the pieces of the inner frame having external projections 153 which interengage with correspondingly recessed portions of the outer frame structure in order to accurately interposition the inner and outer frames. The overall space within the frames is subdivided by partition plates 154, each having a pair of lugs 155—155 at each end which engage in correspondingly shaped cutouts or notches 156 formed in the inner frame plates 152 which extend along two of the opposite sides of the overall mold opening. The partition plates 154 thus divide the overall mold opening into a plurality of individual mold cavities, five being here shown, as in the embodiment of the equipment illustrated in FIGS. 2 to 10.

At the upper side of the entire mold assembly, cover plates 157 are provided, superimposed upon and secured to the mold frame elements, including the upper half of the outer frame, and the inner mold parts 152 and the partitions 154. These cover plates may be secured in position by fastening screws 158 and the covers serve to prevent ingress of granular material into spaces between mold parts, and therey protect the mold structure from abrasive action of such granular material.

The outer mold frame parts at two of the opposite sides thereof are provided with cutouts to form the channels 159, by means of which the mold structure may be fixedly positioned, for instance on the mold turntable 62 above described.

According to the invention, the inner mold walls which define the mold cavities are provided with liners or wear plates, as indicated at 160, see particularly FIGS. 34 to 37. In contrast with various known mold liners, the liners employed according to the present invention are very thin, for instance on the order of 1 to 2 mm in thickness. These liners are desirably cut from cold-rolled band or spring steel. Such chold-rolled band steel, after the cold-rolling and subsequent heat treatment, has very high hardness, at least comparable to various known mold liners of relatively thick construction.

The liners or wear plates of the present invention may readily be cut from a roll of the strip material, and according to the present invention a novel system for applying and replacing such liners is employed. For the purpose of attachment, the invention contemplates adhesively securing the liners in position by means of an adhesive having certain characteristics facilitating liner replacement while at the same time assuring tight adhesion of the liners during use. It is contemplated that the adhesive employed should be one which remains stable under the temperature conditions in which the mold is employed, but which upon heating to a somewhat elevated temperature decomposes so as to destroy the adhesion and thus permit worn liners to be readily removed.

Most advantageously the adhesive is based on cyanoacrylate, epoxy or polyurethane compositions which are settable at room temperature and provide a shear strength of the order of 300 kg/cm$^2$ remaining stable up to at least about 50°–60° C, and still further formulated so as to readily disintegrate at temperatures of the order of 150°–200° C.

In the enlarged view of FIG. 36, the adhesive layer 161 is indicated between one of the lining plates 160 and the inner mold wall 152. The lining pieces or plates can readily be held in position against the inside surfaces of the inner mold wall parts either by clamps or by means of an internal expandable balloon roughly shaped to fit into each individually mold cavity, and inflatable in order to exert pressure against the lining plates and thus hold them against the mold walls during setting of the adhesive.

By employment of this liner attachment system, the lining may readily be changed in a matter of a few minutes. In addition, since the liner plates contemplated for use according to the invention constitute only about 10% of the weight of various prior mold liners, the liner replacement is much less expensive. In addition, the lining plates of the invention do not require any special machining, hardening or final grinding and, as compared with various known liner systems for use in connection with molds for making bricks, the costs are reduced by as much as 50 to 75%.

MODIFIED MOLD LINERS — FIG. 38

Figure 38:
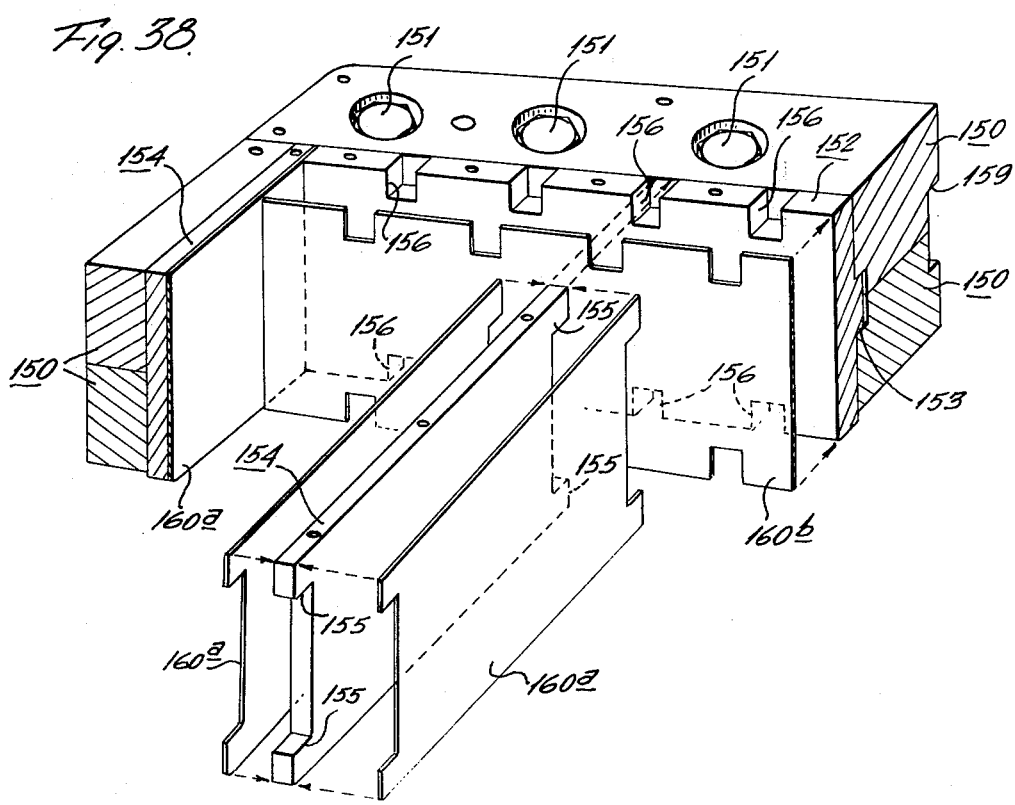
FIG. 38 is a view similar to FIG. 37 but illustrating a modified mold lining arrangement.

In the modified arrangement of FIG. 38, the principal mold parts including the outer frame elements 150, the inner frame parts 152, and the partitions 154 are constructed in essentially the same manner as described above with reference to FIGS. 30 to 37. However, in contrast to the mold liners 160 of the arrangement of FIGS. 30 to 37 which individually cover exposed walls of the individual brick cavities at both the sides and the ends of those cavities, in the arrangement of FIG. 38 the liners employed are somewhat differently configured.

Thus, as will be seen, the liners in FIG. 38 include side wall covering elements such as the partition covering elements 160a each of which is shaped to cover the entire surfaces of the partition 154 including the projecting lugs 155. In addition in the embodiment of FIG. 38, each of the inner mold walls 152 having the notches 156 for receiving the lugs 155 of the partitions are completely covered by a liner 160b proportioned and shaped to cover the entire surface of the inner mold part 152, this element 160b also having notches corresponding to the notches 156.

The arrangement of FIG. 38 is particularly desirable because it makes practical the inversion of the liners after a period of wear and the reuse thereof by adhesively reapplying the liners in inverted position. With this arrangement the liners are provided with notches or lugs interengaging with inner mold parts so that a portion (for instance about 50%) of the brick ejection forces are transferred from the liners through the notches. The adhesive joints therefore need only carry about 50% of the ejection forces, and because of this reduction in the forces carried by the adhesive joints, it is sufficient to apply the adhesive over only a portion of the area of the liners. Preferably the adhesive is applied in strips (for example from 1 to 2 cm wide) adjacent the top and bottom edges of the liners. Since wear of the liners tends to occur irregularly, usually in the region intermediate the top and bottom of the mold, it is of particular advantage that the lining can be inverted.

The arrangement of FIG. 38 has the further advantage of minimizing the total number of separate mold liner pieces which must be cut and individually adhesively secured in place.

MODIFIED CHARGE MEASURING DEVICE — FIG. 39

In the arrangement described above in connection with FIGS. 2 to 10 reference is made to charge measuring by relative adjustment of telescopic measuring mold parts 71-72 (see particularly FIGS. 3, 5 and 6).

Figure 39:
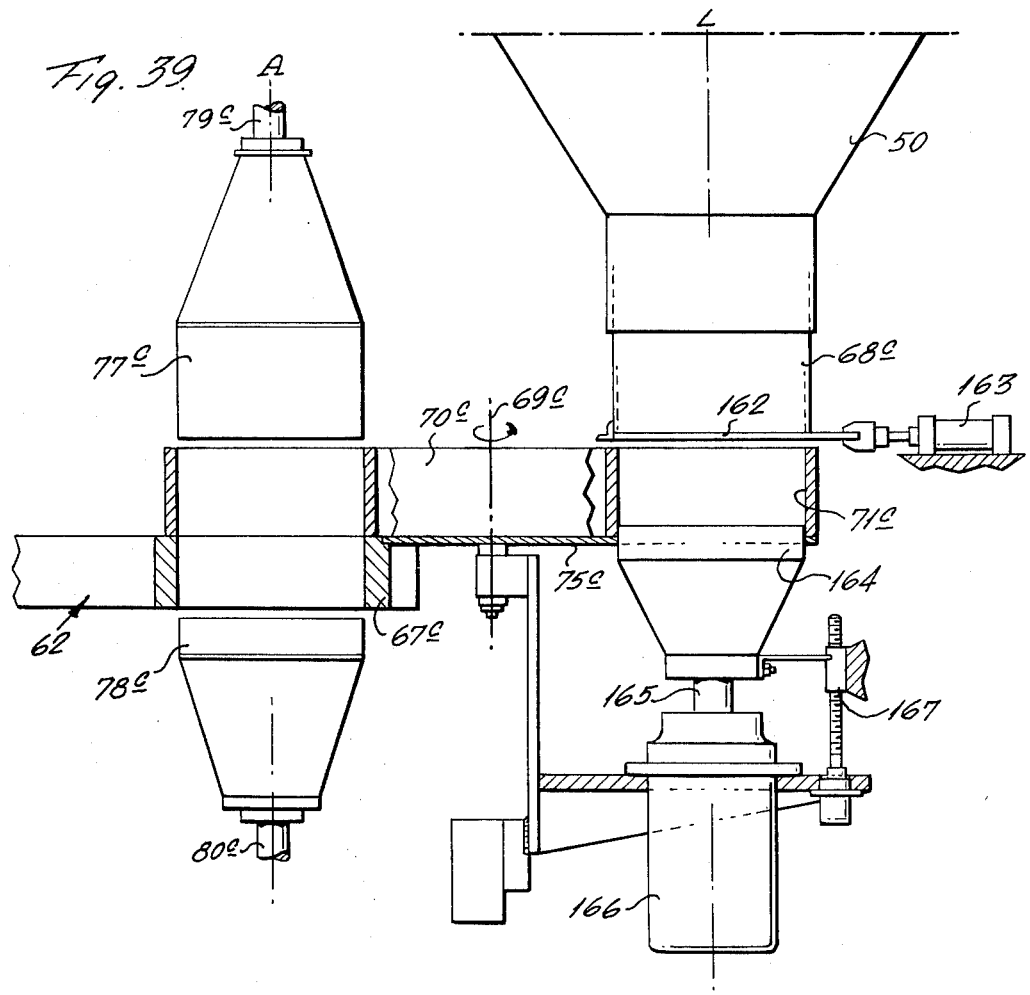
FIG. 39 is an elevational and partial sectional view of an alternative form of charge measuring equipment, this view being taken in the same general manner as the right hand portion of FIG. 3, but illustrating the modified charge measuring equipment on an enlarged scale, as compared with FIG. 3.

An alternative form of measuring equipment is somewhat diagrammatically illustrated in FIG. 39. Here the measuring mold 71c may be a single piece mold mounted upon the auxiliary turntable 70c which is rotatable about the axis 69c, for instance by virtue of mounting on a shaft such as shown at 69 in FIGS. 3 and 5. In this way, the measuring mold 71c may be carried from the loading station represented by the line L to the prepressing station indicated in FIG. 39 by the letter A. p When the measuring mold 71c is positioned at station L, the chute 68c of the hopper 50 registers when the measuring mold, and when the gate diagrammatically indicated at 162 is opened by cylinder 163, the measuring mold is charged. Below the loading station a piston element 164 is provided and is proportioned to enter the lower end of the measuring mold 71c during changing. The piston 164 is carried on the rod 165 adapted to be reciprocated by the cylinder 166. The size of the charge received by the measuring mold 71c may thus be regulated by the vertical position of the piston element 164 and, as in the embodiment shown in FIGS. 2 to 10, this charge may be carried by the measuring mold over the fixed plate 75c to a position in registry with the mold 67c mounted at the precompression station A of the turntable 62.

After the gate 162 has been closed, in preparation for rotation of the auxiliary turntable 70c, the piston 164 is drawn downwardly to the level of the plate 75c, so as to avoid interference with turning of the auxiliary turntable, while at the same time avoiding loss of the granular material which has been charged into the measuring mold 71c. The turntable 70c then rotates and carries the charged measuring mold 71c to its position in registry with one of the molds 67c carried by the main turntable 62. Transfer of the charge from the measuring mold into the mold 67c can then be effected concurrently with precompression under the influence of the press elements 77c and 78c in the manner described above in connection with FIGS. 2 to 10 and also in connection with FIG. 11.

The operation of the piston 164 under the influence of the cylinder 166 is of course timed and controlled by the control mechanism of the press, the piston being raised into the measuring mold 71c at the time when the charging and measuring is to be effected, and being lowered to the level of the plate 75c when the charging has been completed.

The extent to which the piston 164 enters the lower end of the measuring mold 71c is controlled by an adjustable microswitch diagrammatically indicated at 167. This microswitch may be provided with a manual control, but preferably the control system provides for automatic adjustment of the microswitch in accordance with the extent of movement of the high compression pistons (see pistons 83 and 84 in FIG. 11) and thus also in accordance with the size of the bricks being formed. In this way the brick size may be stabilized within close tolerance limits.

We claim:

1. A press for forming bricks comprising an open ended mold, means for introducing a charge of particulate material into one end of the mold, a pair of press elements adapted to enter the opposite ends of the mold, means for applying pressure through the press elements against the charge of material in the mold and for concurrently shifting the position of the press elements toward one end of the mold and thereby shift the mean position of the charge with respect to the side walls of the mold during application of pressure by the press elements and replaceable wear plates covering and adhesively secured to the side walls of the mold by an adhesive which is decomposable at elevated temperature.

2. A brick mold comprising side walls defining a mold cavity open at opposite ends, and a thin sheet metal lining element for a side wall bounded to said side wall by an adhesive which is thermally decomposable at a temperature of the order of 150° C – 200° C.

3. A brick mold as defined in claim 2 in which the mold lining element is configured to provide for inversion thereof to present either side face to the interior of the mold.

4. A brick mold comprising an open ended outer frame structure, inner frame elements including at least one partition spanning the outer frame opening and dividing the outer frame opening into a plurality of individual brick mold cavities each open at opposite ends thereof, and thin sheet metal lining elements bonded to the surfaces of the partition element defining the brick mold cavities, the lining elements being bonded by a thermally decomposable adhesive, the partition element and the lining elements associated with the partition element having means for transferring thrust therefrom to other inner frame elements comprising pairs of spaced lugs formed at the ends of the partition element and of the lining elements which lugs are interengagable with notche formed in said other inner frame elements.

5. A brick mold comprising an open ended outer frame structure, inner frame elements including at least one partition spanning the outer frame opening and dividing the outer frame opening into a plurality of individual brick mold cavities each open at opposite ends thereof, and thin sheet metal lining elements bonded to the surface of the inner frame elements defining the brick mold cavities, the lining elements being bonded by an adhesive which is thermally decomposable at a temperature below about 200° C.

6. A brick mold comprising an open ended outer frame structure, inner frame elements including at least one partition spanning the outer frame opening and dividing the outer frame opening into a plurality of individual brick mold cavities each open at opposite ends thereof, the partition element having spaced lugs at opposite ends interengaging with notches formed in other inner frame elements, and thin sheet metal lining elements having spaced lugs congruent with the lugs of the partition element and being bonded to the surfaces of the partition element, the lining elements being bonded by a thermally decomposable adhesive, and the lining elements being invertable to present either side face to the partition element.

7. A method of applying and replacing a wear lining at a surface of a brick mold comprising bonding a thin liner to said surface by an adhesive which is hardenable by setting at room temperature and which is decomposable at elevated temperature, and removing a worn liner by heating the mold to decompose the adhesive.

8. A method as defined in claim 7 and further including applying a force tightly engaging the liner with the mold wall during setting of the adhesive.

* * * * *

UNITED STATES PATENT AND TRADEMARK OFFICE
CERTIFICATE OF CORRECTION

PATENT NO. : 4,050,865
DATED : September 27, 1977
INVENTOR(S) : Frede Hilmar Drostholm, Harry Jensen & Per Willadsen It is certified that error appears in the above-identified patent and that said Letters Patent are hereby corrected as shown below:

Column 3, line 22, "and" should read --to--.

Column 11, line 18, change "state" to read --stage--;

line 49, change "operator" to read --operated--.

Column 12, line 63, change "cross" to read -- cores --

Column 13, line 32, "upper element 127" should read --upper press element 127--..

Column 17, line 56, change "changing" to read --charging--.

Claim 2, line 3, change "bounded" to read --bonded--.

Signed and Sealed this

Second Day of August 1983

[SEAL]

Attest:

GERALD J. MOSSINGHOFF

Attesting Officer

Commissioner of Patents and Trademarks